(12) United States Patent
Vogedes et al.

(10) Patent No.: US 8,731,822 B2
(45) Date of Patent: May 20, 2014

(54) SYSTEMS AND METHODS FOR INTERLEAVING NAVIGATIONAL DIRECTIONS WITH ADDITIONAL AUDIO IN A MOBILE DEVICE

(75) Inventors: Jerome Vogedes, Milwaukee, WI (US); Mark R Lemke, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 13/351,355

(22) Filed: Jan. 17, 2012

(65) Prior Publication Data

US 2013/0184981 A1 Jul. 18, 2013

(51) Int. Cl.
*G01C 21/26* (2006.01)
*G01C 21/36* (2006.01)

(52) U.S. Cl.
USPC ........ 701/431; 701/487; 455/569.2; 455/570; 455/246.1

(58) Field of Classification Search
CPC ............. H04R 2420/01; G08G 1/0962; G08G 1/096872; H04H 20/62
USPC ......... 701/400, 419, 426, 428, 540, 430, 431; 455/234.1, 238.1, 246.1, 345, 567, 455/569.2, 575.9
See application file for complete search history.

(56) References Cited

U.S. PATENT DOCUMENTS

| 6,594,580 | B1 | 7/2003 | Tada et al. |
| 7,577,262 | B2 * | 8/2009 | Kanamori et al. ........... 381/94.7 |
| 7,805,150 | B2 | 9/2010 | Graham et al. |
| 7,835,857 | B2 | 11/2010 | Gretton |
| 7,865,282 | B2 | 1/2011 | Murlidar et al. |
| 7,996,422 | B2 | 8/2011 | Shahraray et al. |
| 2005/0159945 | A1 * | 7/2005 | Otsuka et al. .................. 704/226 |

(Continued)

FOREIGN PATENT DOCUMENTS

| DE | 102008043392 A1 | 5/2010 |
| WO | 2001024136 A1 | 4/2001 |
| WO | 2008014214 A2 | 1/2008 |

OTHER PUBLICATIONS

Tomtom International BV, "Receiving phone calls with iPhone while navigating", http://uk.support.tomtom.com/app/answers/detail/a_id/10567/~/receiving-phone-calls-with-iphone-while-navigating, downloaded Jul. 3, 2012, 1 page.

(Continued)

*Primary Examiner* — Fadey Jabr
*Assistant Examiner* — Thomas Ingram
(74) *Attorney, Agent, or Firm* — Matthew R. Carey; Marshall, Gerstein & Borun LLP; Sylvia Chen

(57) ABSTRACT

A method and apparatus for managing audio conflicts and priorities is disclosed. A mobile device (110) initiates a navigation application (410) and an audio application (415), each configured to utilize audio input and/or output components. The mobile device identifies (430, 435) a priority of a communication associated with the audio application and manages (440, 445) the audio input and output components based on the priority and other factors. In particular, the mobile device or components thereof can delay (440) an indication of the communication until a sufficient break in a route traversal is reached, can mute (445) the audio input component while the navigation application utilizes the audio output component, and/or can perform other functions related to the audio conflicts and priorities of the applications.

15 Claims, 5 Drawing Sheets

(56) References Cited

U.S. PATENT DOCUMENTS

| | | | |
|---|---|---|---|
| 2007/0124073 A1 | 5/2007 | Kuo et al. | |
| 2007/0182529 A1* | 8/2007 | Dobler et al. | 340/438 |
| 2007/0276596 A1 | 11/2007 | Solomon et al. | |
| 2008/0026786 A1 | 1/2008 | Kuo et al. | |
| 2008/0032663 A1* | 2/2008 | Doyle | 455/345 |
| 2008/0077310 A1 | 3/2008 | Murlidar et al. | |
| 2009/0068950 A1* | 3/2009 | Tkachenko et al. | 455/41.3 |
| 2010/0088096 A1* | 4/2010 | Parsons | 704/235 |
| 2011/0161006 A1* | 6/2011 | Deurwaarder | 701/207 |
| 2012/0022777 A1* | 1/2012 | James | 701/201 |
| 2012/0089401 A1* | 4/2012 | Hymel et al. | 704/260 |
| 2013/0291086 A1* | 10/2013 | Pontillo et al. | 726/10 |

OTHER PUBLICATIONS

Fred Zahradnik, "Garmin StreetPilot iPhone App Review—Road Testing StreetPilot", http://gps.about.com/od/mobilephonegps/gr/Garmin-StreetPilot-GPS-App-Review.htm, downloaded Nov. 29, 2012, 2 pages.

Patent Cooperation Treaty, "PCT Search Report and Written Opinion of the International Searching Authority" for International Application No. PCT/US2012/069396 dated Apr. 19, 2013, 15 pages.

* cited by examiner

| | |
|---|---|
| 305 | PRIORITY A CONTACT LIST |
| 310 | MOM |
| 310 | DAD |
| 310 | WIFE |
| 310 | BOSS |
| 315 | [CALENDAR APPOINTMENT CONTACT] |
| | ... |
| 320 | PRIORITY B CONTACT LIST |
| 325 | MOTHER-IN-LAW |
| 325 | COUSIN |
| 325 | AUNT |
| 325 | GRANDMA |
| | ... |

FIG. 3

SYSTEMS AND METHODS FOR INTERLEAVING NAVIGATIONAL DIRECTIONS WITH ADDITIONAL AUDIO IN A MOBILE DEVICE

FIELD

This application generally relates to audio delivery, and more particularly to platforms and techniques for managing audio conflicts and/or priorities for multiple applications in a mobile device.

BACKGROUND

Current mobile devices incorporate various applications capable of using audio components associated with the mobile devices and related components. For example, applications that facilitate or support voice calls, voice over IP (VoIP) calls, text-to-voice messages, push-to-talk (PTT) technology, PTT over cellular (POC) technology, and other audio applications, can use speaker and microphone components associated with the mobile devices.

There are shortcomings, however, in current techniques for managing audio conflicts and priorities among the applications of a mobile device. For example, in some cases, if a navigation application is executing on the mobile device of a user operating a vehicle, and an incoming call is received, then the mobile device may terminate the navigation application to receive the incoming call. After the incoming call terminates, the user must restart the navigation application and re-enter the destination. As a further example, in another case, if a navigation application is executing on the mobile device, and an incoming call is answered by a vehicle operator, then a party on the other end of the call can hear directions that are audibly output by the navigation application. A security concern can result, as the vehicle operator may not want the other party to know to that the vehicle operator is traveling.

Accordingly, there is an opportunity for more effective techniques for managing audio conflicts and/or priorities.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an exemplary data record in accordance with some embodiments.

DETAILED DESCRIPTION

Figure 1:
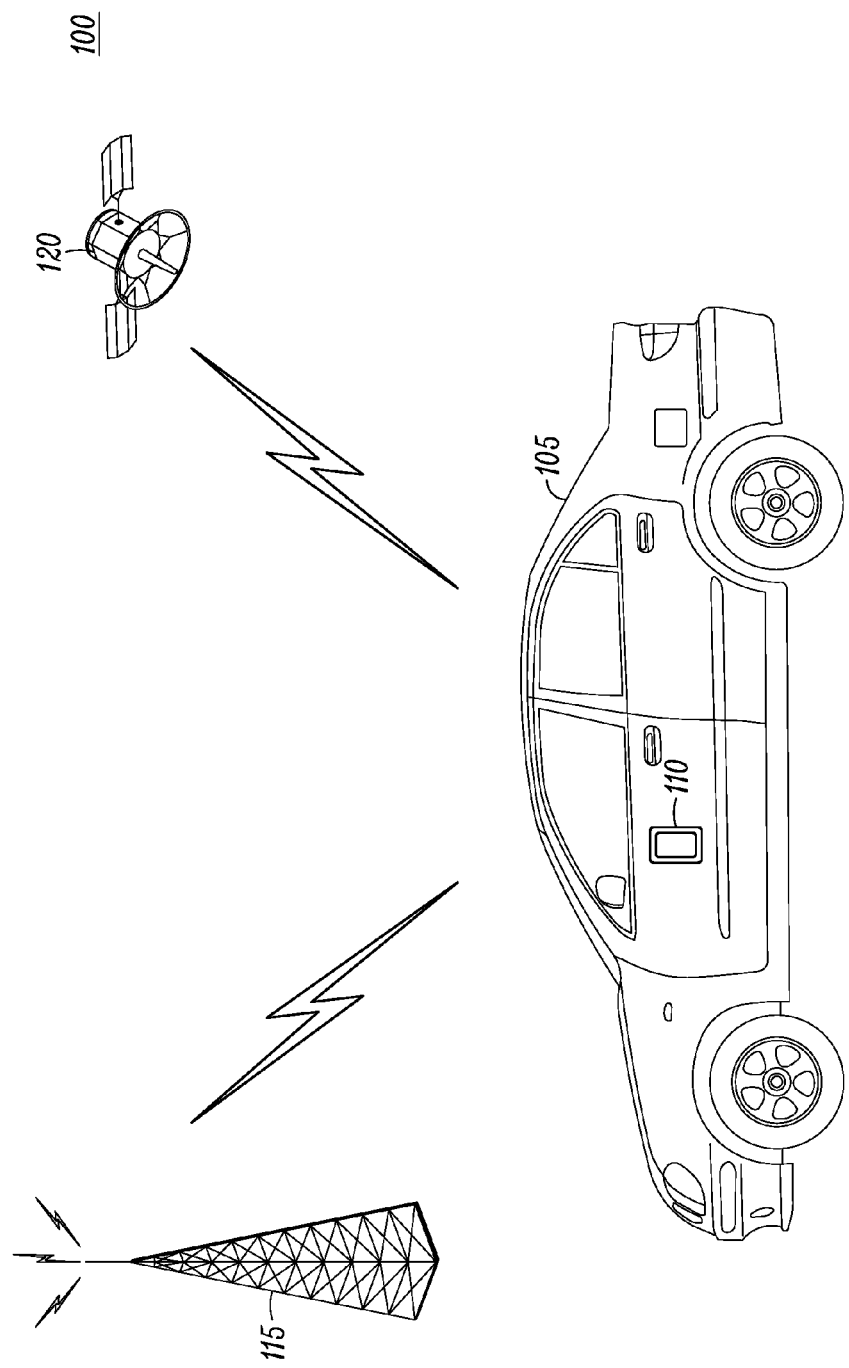
FIG. 1 is a block diagram of an exemplary environment in accordance with some embodiments.

A method and apparatus for a communication device in a communication system provides effective and efficient audio conflict or priority management. The communication device can support an initialization of a navigation application and an audio application. The navigation application can be configured to audibly output directions and instructions via a speaker of the communication device and/or other audio components in the communication system, and the audio application can be configured to receive audio input via a microphone component and output audio via the speaker of the communication device and/or the other audio components.

The method and apparatus manages audio conflicts or priorities associated with the navigation application and the audio application using the audio components of the communication device and/or communication system. More particularly, the method and apparatus detects an initiation of the audio application (e.g., an incoming call) when the navigation application is executing on the communication device. In some cases, the method and apparatus determines whether the initiation of the audio application has an associated high or low priority. Based on the priority of the initiation of the audio application, the method and apparatus manages audio input and output associated with the operation of the navigation application and the audio application. More particularly, the method and apparatus can mute a microphone of the communication device when the navigation application outputs directions, can disable any navigation warnings from being output, and/or can perform other functions.

The method and apparatus as discussed herein can offer many improvements to existing audio content managing techniques. For example, the navigation application can remain executing when the audio application is initialized, thereby obviating the need for a user of the device to restart and reconfigure the navigation application upon termination of the audio application. Further, directions that are audibly output by the navigation application will not be transmitted to an additional party of the audio application, thereby alleviating security concerns associated with the additional party obtaining sensitive information. Still further, the method and apparatus can reduce the number of audio instructions or warnings associated with the execution of the navigation application, thereby reducing the number of interruptions of the audio application.

As used herein, a "navigation application" can be understood to be any type of application, program, set of executable instructions, and/or the like that can be configured to audibly output directions, indications, instructions, warnings, and other audio cues associated with a navigation or traversal of a route, circuit, course, path, and/or the like. Further, as used herein, an "audio application" can be understood to be any type of application, program, set of executable instructions, and/or the like that can be configured to output audio content and/or receive audio input. For example, the audio application can be a phone application, voice over IP (VoIP) application, text-to-speech messaging application, push-to-talk (PTT) application, PTT over cellular (POC) application, and/or other similar audio applications. Further, it should be understood that the input and output of audio can occur via any components capable of interfacing with or connecting to the navigation and audio applications such as, for example, microphones and speakers of mobile devices or vehicles in which the mobile devices are located, Bluetooth® headsets, or similar external peripheral devices.

FIG. 1 illustrates a block diagram of an exemplary environment 100. It should be appreciated that each of the components of the environment 100 can have one or multiple entities. The environment 100 includes a vehicle 105 with a mobile device 110 operating therein. For example, an operator or passenger of the vehicle 105 can utilize the mobile device 110 and applications thereof during operation of the vehicle 105. The mobile device 110 can have a set of applications configured to utilize audio components of the mobile device 110 and/or the vehicle 105. For example, an operator or passenger of the vehicle 105 can use a navigation application to calculate or determine a route to a destination, and the navigation application can audibly output turn-by-turn directions to the destination via a speaker of the mobile device 110. For further example, the mobile device 110 can be configured with an audio application, such as a phone application, that is capable of receiving and transmitting audio, and outputting audio. In some cases, the navigation application and the audio application can output or receive audio via a speaker(s) or microphone(s) of the vehicle 105, via a pairing with a Bluetooth® peripheral device, and/or via other components. It should be appreciated that the mobile device 110 can be configured with other various audio applications such as, for example, voice over IP (VoIP) applications, text-to-speech messaging applications, push-to-talk (PTT) applications, PTT over cellular (POC) applications, and/or other similar audio applications.

As shown in FIG. 1, the environment 100 can have multiple networks configured to communicate with the components of the mobile device 110 and/or the vehicle 105. In particular, the environment 100 can include a satellite 120 and a base station 115. The satellite 120 can be a global positioning system (GPS) satellite that can be configured to provide GPS information to the mobile device 110 and/or the navigation application. In particular, the mobile device 110 can be configured with a GPS receiver chip that can calculate GPS coordinates to locate the mobile device 110, calculate directions to a destination, and perform other functionalities. The base station 115 can facilitate any type of wireless data communication via any standard or technology (e.g., GSM, CDMA, TDMA, WCDMA, EDGE, OFDM, GPRS, EV-DO, WiMAX, WiFi, Bluetooth, UWB, and others). For example, a user of the mobile device 110 can place or receive calls via wireless communication with the base station 115.

According to methods and apparatuses as discussed herein, the mobile device 110 can be configured to resolve audio conflicts or priorities among (and/or alleviate security concerns with) audio applications and navigation applications. For example, a navigation application can frequently interrupt a call-in-progress on a phone application with warnings associated with turn-by-turn directions. For further example, a security concern exists when a party to a phone call can hear directions output by the navigation application. It should be appreciated that there are further benefits envisioned.

In some implementations, a user of the mobile device 110 can input a set of rules or priorities for resolving audio conflicts or managing audio priorities. For example, the user can specify a set of contacts that should receive a high priority (e.g., a spouse, a family member, etc.), another set of contacts that should receive a low priority (e.g., an unknown number, an individual not in a contact list), and other priority conventions. The set of rules or priorities can be added, removed, and/or updated by the user and/or dynamically. For example, the mobile device 110 can access a calendar application to determine if there are any contacts associated with an appointment that need to be temporality placed on a high-priority list. In some cases, the audio application can determine, via the navigation application, that the user is en route to a location of the appointment, and can update the high- and/or low-priority lists appropriately.

According to implementations, the mobile device 110 and components thereof can be configured to resolve audio conflicts and/or alleviate security concerns when an audio application initiates while a navigation application is executing, or vice-versa. In some cases, if the navigation application is providing turn-by-turn directions to an operator of the vehicle 105, and the audio application initiates, then the navigation application can be configured to determine a subsequent direction of the turn-by-turn directions and audibly output a status associated with the subsequent direction. For example, if the subsequent direction is a right turn in five (5) miles, then the navigation application, upon the audio application initiating, can inform the operator that there is a right turn in 5 miles.

The mobile device 110 can be further be configured to mute any navigation warnings associated with the turn-by-turn directions, or otherwise prevent any navigation warnings to be output. The navigation warnings can be in contrast to navigation instructions. For example, the navigation warnings can be any indications of upcoming directions (e.g., "in 2 blocks, turn right"), and the navigation instructions can be explicit instructions associated with a route to a destination (e.g., "turn right here"). In some cases, the audio application can control the speaker of the mobile device 110 and prevent the navigation application from outputting the navigation warnings via the speaker. For example, the audio application can gain exclusive access to the speaker such that the navigation warnings will not be output via the speaker. In other cases, the navigation application can determine that the audio application is initiated and can neither generate nor output the navigation warnings. More particularly, the navigation application can receive a "flag" or other type of indication that indicates that the audio application is active and, in response to receiving the flag, can refrain from generating and/or outputting the navigation warnings.

In cases in which a phone application initiates during execution of the navigation application, the mobile device 110 can determine if an incoming call is being received or if a user of the mobile device 110 is placing an outgoing call. If an incoming call is being received, the mobile device 110 can examine the set of rules or priorities to determine if the call is a high-priority call or low-priority call. More particularly, the mobile device 110 can identify the caller of the incoming call and compare the caller to the set of rules or priorities. For example, if the mobile device 110 user's spouse is the caller, and the user's spouse is on a high-priority list, then the mobile device 110 can assign a high priority to the incoming call. In another example, if the incoming call is from an unknown number, and the set of rules or priorities indicates that any unknown number should be low priority, then the mobile device 110 can assign a low priority to the incoming call.

The mobile device 110 can be configured to manage the audio outputs and functions of the navigation and audio applications based on the priority of the incoming call. In some cases, if the incoming call is assigned a low priority, the mobile device 110 can be configured to delay an alert associated with the incoming call or place the incoming call on a temporary hold until a sufficient break in the turn-by-turn directions of the navigation application. In particular, the navigation application can estimate or approximate an amount a time before a subsequent direction will be output by the navigation application and compare the amount of time to a threshold value that is settable by the user or other entities. If the amount of time is less than the threshold value, the audio application can place the call on a temporary hold until the amount of time meets or exceeds the threshold value. Further, in some cases, the audio application can route the incoming call to a voice mailbox module or similar answering component if the amount of time is less than the threshold value. If the amount of time meets or exceeds the threshold value, the audio application can provide an indication of the incoming call to the user. For example, the mobile device 110 can ring, vibrate, and/or perform other alert functionalities. The user can then select whether to answer or ignore the call.

In some cases, the mobile device 110 can provide, to the user, an indication of the estimated or approximated amount of time of a break to allow the user the option to accept or decline an incoming call, or to provide a user wishing to place an outgoing call with information. For example, if the mobile device 110 receives an incoming call and determines that the subsequent direction is a right turn in one mile, then the mobile device 110 can indicate, to the user, that the subsequent direction is a right turn in one mile and can allow the user to accept or decline the incoming call. Further, for example, if the user wishes to place an outgoing call and the mobile device 110 determines that the subsequent direction is a left turn in two miles, then the mobile device 110 can indicate, to the user, that the subsequent direction is a left turn in two miles and that the call may be interrupted with navigation directions in an approximate amount of time, and can prompt the user to select whether he/she still wishes to place the outgoing call. It should be appreciated that various alert delaying functionalities, threshold value determinations, and alert indications are envisioned. Further, it should be appreciated that the priority handling functionality as discussed herein can be applied to audio applications other than phone applications. For example, the mobile device 110 can similarly delay an alert associated with a text-to-voice SMS until a sufficient break in the navigation application.

The mobile device 110 can be further configured to manage the audio input and output of the associated components when the audio application connects or otherwise initiates audio input and output. For example, the audio application can connect when the user places an outgoing call, if an incoming call is from a high-priority contact, or when an incoming call is from a low-priority contact but if a sufficient break exists before a subsequent direction. In managing the audio input and output, the mobile device 110 can be configured to mute the microphone of the mobile device 110, the vehicle 105, and/or any peripheral devices when the navigation application needs to output a direction. More particularly, either the audio application or the navigation application can be configured to mute the microphone and/or other input components when the navigation application outputs a navigation direction (e.g., "turn left here"), thereby preventing a party on the other end of the audio application from hearing the navigation direction output. Further, the mobile device 110 can terminate the audio conflict management functionality upon the audio application exiting, the navigation application exiting, and/or other triggers.

Figure 2:
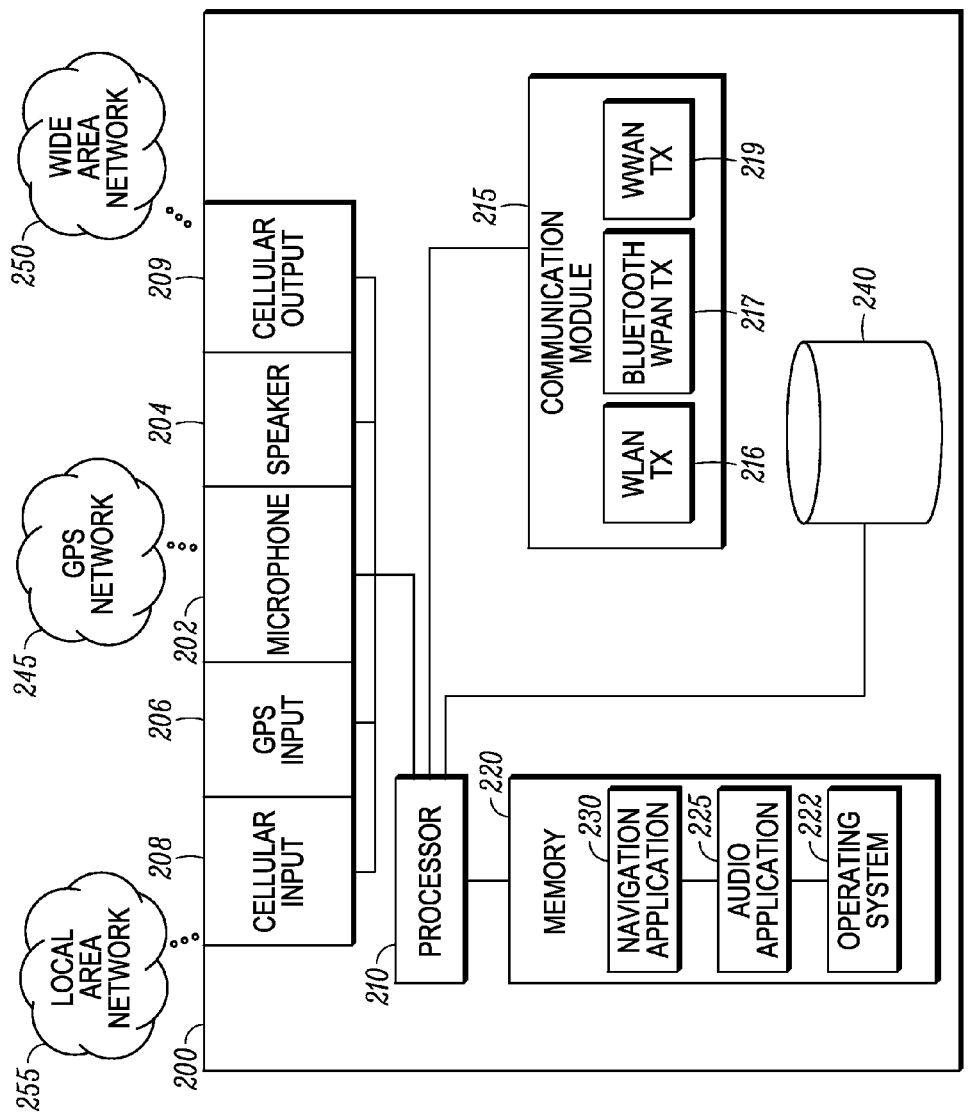
FIG. 2 is a more-detailed block diagram of a communication device in accordance with some embodiments.

Referring to FIG. 2, depicted is an exemplary mobile device 200 and components thereof. It should be appreciated that FIG. 2 represents a generalized schematic illustration and that other components and/or entities can be added or existing components and/or entities can be removed or modified.

As shown in FIG. 2, the mobile device 200 can include a set of ports (logical ports or physical ports) that can receive input signals or data from, or output signals or data to, other components of a data transmission environment, such as the cellular towers 115, the GPS satellites 120, and others, as discussed herein. More particularly, a cellular input port 208 can be configured to receive cellular data related to a cellular telephone call. Further, a cellular output port 209 can be configured to output cellular telephone call data. Still further, a GPS input port 206 can be configured to receive GPS location data via, for example, GPS satellites.

The mobile device 200 can further include a microphone port 202 that can be configured to receive audio and a speaker port 204 that can be configured to output audio. It should be appreciated that the microphone port 202 can be a hardware jack socket (e.g., a 3.5 mm TRS connector) that can be electrically coupled to a microphone transducer, an integrated hardware component that can convert sound into an electrical signal (e.g., an integrated microphone), or a logical port created using a Bluetooth receiver that can be wirelessly coupled to a Bluetooth microphone (e.g., in a Bluetooth headset). Further, it should be appreciated that the speaker port 204 can be a hardware jack socket (e.g., a 3.5 mm TRS connector) that can be electrically coupled to a loudspeaker transducer, an integrated hardware component that can produce sound in response to an electrical audio signal input, or a logical port created using a Bluetooth transmitter that can be wirelessly coupled to a Bluetooth loudspeaker (e.g., in a Bluetooth headset).

The mobile device 200 can further include a processor 210 communicating with a memory 220, such as electronic random access memory, or other forms of transitory or non-transitory computer readable storage mediums, operating under control of or in conjunction with an operating system 222. The operating system 222 can be any commercial, open-source, or proprietary operating system or platform. The processor 210 can communicate with a database 240, such as a database stored on a local hard drive. While illustrated as a local database in the mobile device 200, the database 240 can be separate from the mobile device 200.

The processor 210 can further communicate with a wireless communication module 215 to implement one or more of the ports 202, 204, 206, 208, 209, such as a wired or wireless data connection. More particularly, the communication module 215 can include a GPS receiver to process GPS signals received from the GPS network 245 when configured as the GPS input port 206. The communication module 215 can also communicate with a wide area network 250, such as a cellular network including one or more cell sites or base stations to implement cellular input port 208 and cellular output port 209. The cellular network 250 can communicatively connect the mobile device 200 to additional devices. The communication module 215 can include radio transceivers that communicate with a local area network 255 or other networks. The communication module 215 can also include a Bluetooth® WPAN transceiver 217 that can connect to elements in a wireless personal area network (e.g., a Bluetooth headset) as previously described when configured as microphone port 202 and/or speaker port 204.

The processor 210 can also communicate with a navigation application 230 that can be configured to provide turn-by-turn directions to a user. Further, the processor 210 can communicate with an audio application 225 that can be configured to utilize the components of the mobile device 200, such as the microphone port 202 and/or the speaker port 204. For example, the audio application 225 can be a phone application or other applications or modules. It should be appreciated that other applications and functionalities are envisioned. For example, the mobile device 200 can include an application configured to examine a listing of rules or priorities to resolve priorities or audio conflicts, and a calendar application configured to maintain a listing of appointments and associated contacts for the appointments.

While FIG. 2 illustrates the mobile device 200 as a standalone system having a combination of hardware and software, the components of the mobile device 200 can also be implemented as a software application or program capable of being executed by a conventional computer platform. Likewise, the components of the mobile device 200 can also be implemented as a software module or program module capable of being incorporated in other software applications and programs. In either case, the components of the mobile device 200 can be implemented in any type of conventional proprietary or open-source computer language.

Referring to FIG. 3, depicted is an exemplary data record 300 detailing a listing of priorities. It should be appreciated that the data record 300 is merely exemplary and can include any type of data capable of being stored, accessed, updated, and/or deleted. According to the systems and methods, a user of a mobile device can set and/or update the data of the data record 300 according to various preferences.

As shown in FIG. 3, the data record 300 can have a priority A contact list 305 and a priority B contact list 320. For example, the priority A contact list 305 can include a listing of individuals or entities 310 who have a "high" priority, and the priority B contact list 320 can include a listing of individuals or entities 325 who have a "low" priority. A mobile device, such as the mobile device 110, can examine the data record 300 and the associated lists 305, 320 to determine priorities and resolve conflicts associated with audio and navigation applications, as discussed herein. For example, upon a phone application receiving an incoming call, the phone application or other component can examine the data record 300 to determine if the incoming call is from a contact on either of the associated lists 305, 320. If the contact is on the priority A contact list 305, then the phone application can designate that the incoming call has a higher priority, and if the contact is on the priority B contact list 320, then the phone application can designate that the incoming call has a lower priority.

In some cases, either the priority A contact list 305 or the priority B contact list 320 can have one or more dynamic entries. For example, the mobile device can interface the data record 300 with a calendar application of the mobile device and insert any contacts 315 associated with an appointment on the priority A contact list 305. More particularly, if at 2:45 PM a user of the mobile device is traveling to an appointment scheduled for 3:00 PM, then the mobile device can place any contacts associated with the 3:00 PM appointment on the priority A contact list 305. That way, if one of the appointment contacts calls the user, then that contact can receive a higher priority. Further, the appointment contacts can be removed from the priority A contact list 305 when the appointment time has passed. It should be appreciated that other dynamic contact use cases are envisioned.

Figure 4:
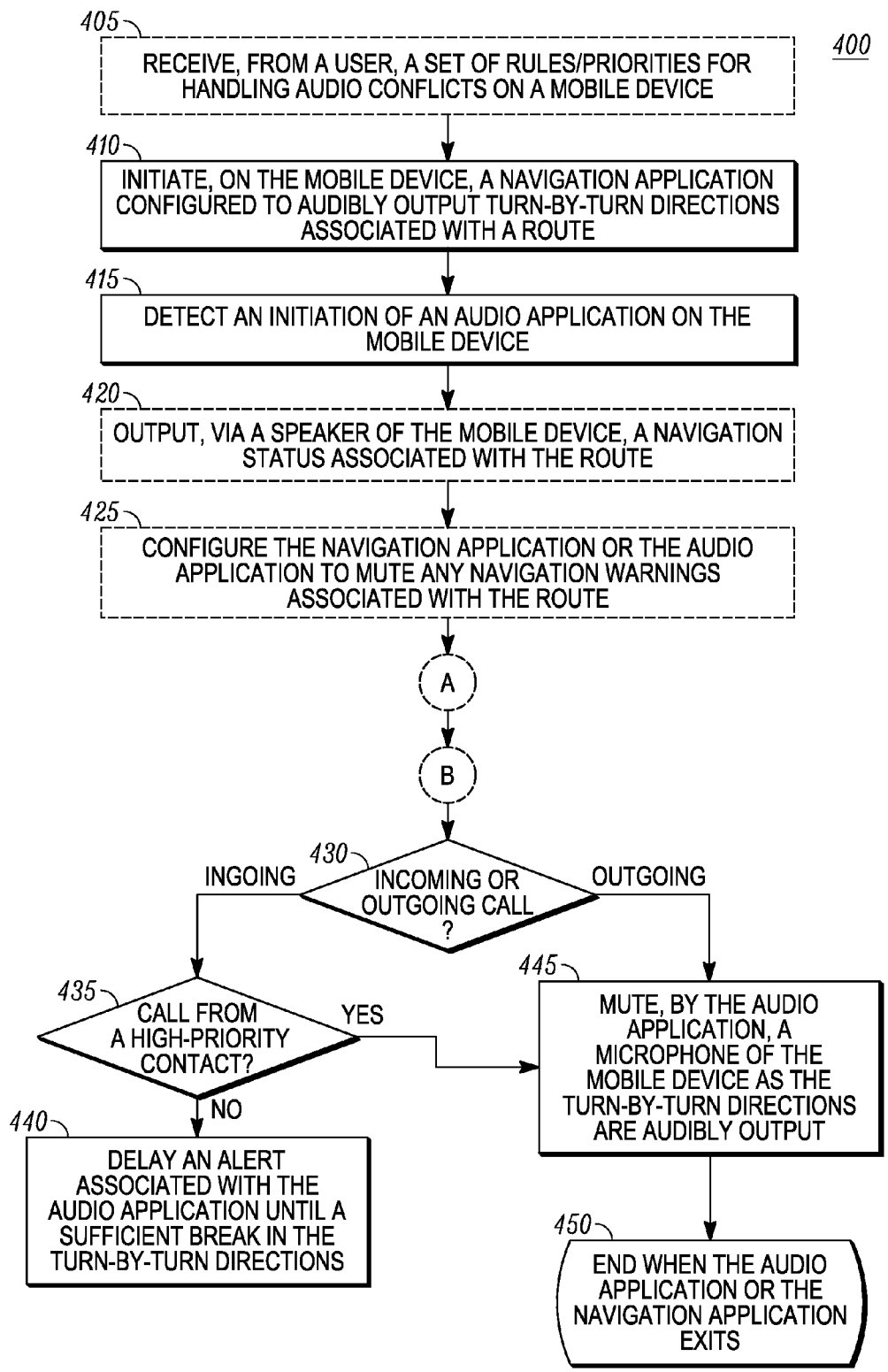
FIG. 4 is a flow diagram depicting a management of audio applications in accordance with some embodiments.

FIG. 4 is a flowchart of a method 400 for a mobile device (such as the mobile device 110 shown in FIG. 1) to manage audio conflicts or priorities associated with audio and/or navigation applications of the mobile device. The method 400 begins with the mobile device optionally receiving 405, from a user, a set of rules/priorities for handling audio conflicts on the mobile device. For example, the user can specify which contacts have a high priority and which contacts have a low priority when an incoming call is received. In some cases, the mobile device can interface with an associated calendar application to dynamically add contacts to the set of rules/priorities. The mobile device initiates 410 a navigation application configured to audibly output turn-by-turn directions associated with a route. For example, the user can input a destination and the navigation application can calculate a route to the destination and can output, via the speaker of the mobile device or other output components, the navigation warnings and turn-by-turn directions associated with the route.

The mobile device detects 415 an initiation of an audio application on the mobile device. For example, a phone application can detect an incoming call or a messaging application can detect an incoming text-to-voice message. For further example, a user can initiate a phone application to place an outgoing call. The mobile device optionally outputs 420, via a speaker, a navigation status associated with the route. In some cases, the navigation application can determine a subsequent direction of the turn-by-turn directions and output an indication of the subsequent direction (e.g., "turn right at the next exit in 15 miles").

The mobile device optionally configures 425 the navigation application or the audio application to mute any navigation warnings associated with the route. For example, the navigation warnings can be any indications of upcoming directions (e.g., "in 2 blocks, turn right"), as opposed to a navigation instruction (e.g., "turn right here"). In some cases, the audio application can control the speaker of the mobile device and prevent the navigation application from outputting the navigation warnings via the speaker. In other cases, the navigation application can determine that the audio application is initiated and can neither generate nor output the navigation warnings.

Figure 5:
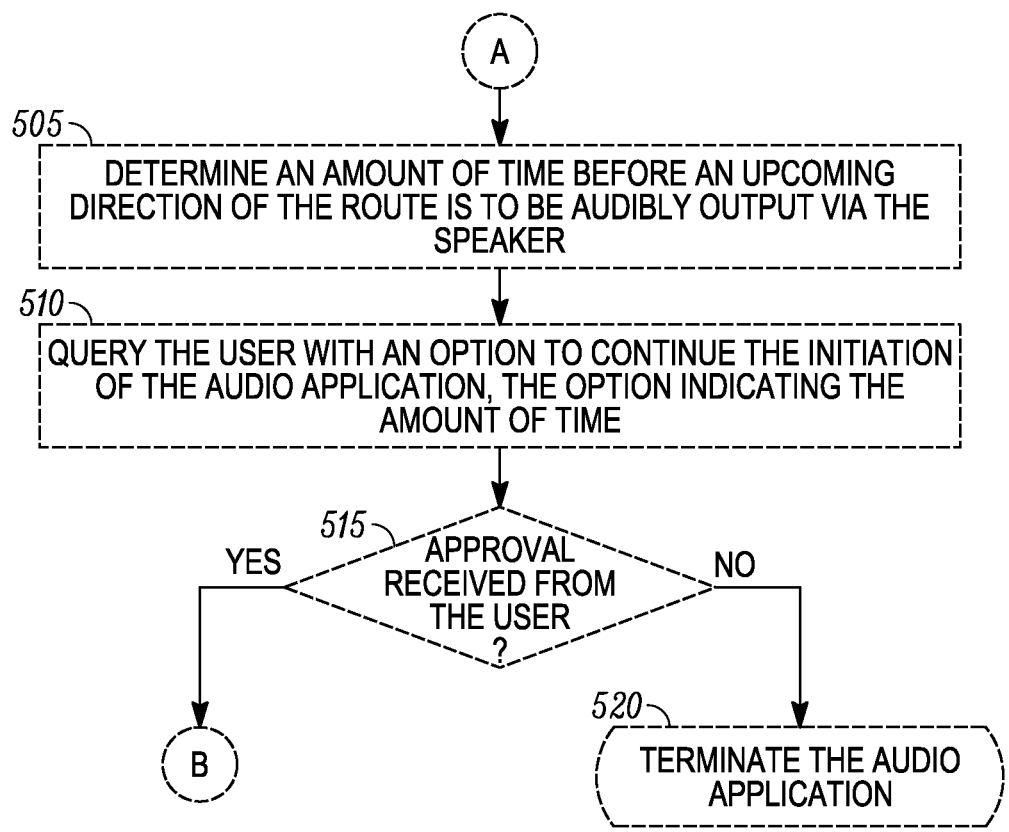
FIG. 5 is a supplemental flow diagram depicting a management of audio applications in accordance with some embodiments.

After the configuration ("A"), and referring to FIG. 5, the mobile device optionally estimates 505 an amount of time before an upcoming direction of the route is to be audibly output via the speaker. In particular, the amount of time before the upcoming direction is to be audibly output can be estimated from a distance remaining and a current rate of velocity of the vehicle. The mobile device further optionally queries 510 the user with an option to continue the initiation of the audio application, wherein the option indicates the estimated amount of time. For example, if the user is placing an outgoing call, then the query can indicate that there is an upcoming direction in a certain amount of minutes and can require approval to place the outgoing call. Further, for example, if the user is receiving an incoming call, then the query can indicate that there is an upcoming direction in a certain amount of minutes and can require approval to receive the incoming call.

The mobile device optionally determines 515 if approval has been received from the user. If approval is received ("YES", "B"), then processing returns to "B" of FIG. 4. In contrast, if approval is not received ("NO"), then the mobile device optionally terminates 520 the audio application. In some cases, if an incoming call is received, then the mobile device can decline the call, route the incoming call to a voice mailbox module, or perform other functions as part of termination 520.

Referring back to FIG. 4, the mobile device determines 430, if the audio application is a phone application or the like, if the initiation of the audio application is an incoming call or an outgoing call. If the call is an incoming call ("INCOMING"), then the mobile device determines 435 if the call is from a high-priority contact. For example, the mobile device can examine the set of rules/priorities to determine if the call is from an individual or entity with a higher priority. If the call is not from a high-priority contact ("NO"), then the mobile device delays 440 an alert associated with the audio application until a sufficient break in the turn-by-turn directions. In some cases, the audio application and/or the navigation application can estimate or approximate how much time and/or distance there is before the next direction is to be audibly output. If the time and/or distance does not meet or exceed a threshold (e.g., 5 minutes, 2 miles, etc.), then the audio application and/or the navigation application can delay the alert until the time and/or distance meets or exceeds the threshold, upon which the audio application can provide an indication of the incoming call. In some cases, if the time and/or distance does not meet or exceed the threshold, then the audio application can route the incoming call to a voice mailbox module. In other cases, the audio application can indicate the time and/or distance to the user and allow the user the option to accept or decline the incoming call. If the time and/or distance does meet or exceed the threshold, then the audio application can provide an indication of the incoming call to the user (e.g., a ringtone), and processing can proceed to 445.

If the call is an outgoing call ("OUTGOING"), the call is from a high-priority individual ("YES"), or a sufficient break in the turn-by-turn directions has been reached, then the audio application can connect the call between the parties. In some cases, if the call is an incoming call, then the user can select whether to answer or decline the call. In other cases, if the call is an outgoing call, then the mobile device can indicate an approximate amount of time or distance before a subsequent direction will need to be outputted by the navigation application, and can prompt the user to select whether to cancel or place the outgoing call. After the call is connected, the mobile device mutes 445 a microphone of the mobile device as the turn-by-turn directions are audibly output. More particularly, the microphone of the mobile device will not receive and/or process any audio input while the navigation application outputs the turn-by-turn directions via the speaker. The method 400 ends 450 when either the audio application or the navigation application exits or terminates. For example, the method 400 can end when the call terminates, when the destination is reached, or upon other triggers.

Thus, it should be clear from the preceding disclosure that a method and apparatus in a communication system manages audio conflicts and priorities between an audio application and a navigation application executing on a communication device. The method and apparatus advantageously allows the communication device to concurrently execute the audio application and the navigation application with minimal audio conflict. The method and apparatus further advantageously prevents potentially sensitive information from being transmitted to additional parties.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in an electronic communication device, the electronic communication device comprising an audio application configured to utilize a first audio component and a second audio component configured to receive audio, the method comprising:
   determining, by a processor, that a navigation application is active, wherein the navigation application is configured to audibly output directions via the first audio component;
   identifying, by a processor, an audio output associated with the navigation application; and
   preventing, by a processor, the second audio component from receiving any audio input while the audio output is output via the first audio component.

2. The method of claim 1, wherein, when the audio output is an upcoming warning associated with the directions, the method further comprises:
   preventing the upcoming warning from being audibly output via the first audio component.

3. The method of claim 1, wherein the audio output is an upcoming direction of the directions.

4. The method of claim 1, further comprising:
   detecting an incoming audio stream element associated with the audio application;
   examining a listing of at least one rule to determine that the incoming audio stream element has a high priority; and
   providing, to a user of the electronic communication device, an indication of the incoming audio stream element.

5. The method of claim 1, further comprising:
   detecting an incoming audio stream element associated with the audio application;
   examining a listing of at least one rule to determine that the incoming audio stream element has a low priority;
   estimating an amount of time before an upcoming direction of the directions is to be audibly output via the first audio component; and
   managing the incoming audio stream element based on the amount of time.

6. The method of claim 5, wherein managing the incoming audio stream element comprises:
   determining that the amount of time does not meet or exceed a threshold; and
   delaying an alert associated with the incoming audio stream element.

7. The method of claim 6, wherein the alert is delayed until the amount of time meets or exceeds the threshold.

8. The method of claim 5, wherein managing the incoming audio stream element comprises:
   determining that the amount of time does not meet or exceed a threshold; and
   routing the incoming audio stream element to a voice mailbox module.

9. The method of claim 5, wherein managing the incoming audio stream element comprises:
   determining that the amount of time meets or exceeds a threshold; and
   providing, to a user of the electronic communication device, an indication of the incoming audio stream element.

10. The method of claim 1, wherein the first audio component is a speaker and the second audio component is a microphone.

11. The method of claim 1, further comprising:
   detecting an initialization of an audio stream associated with the audio application;
   estimating an amount of time before an upcoming direction of the directions is to be audibly output via the first audio component;
   querying a user of the electronic communication device with an option to continue the initialization, wherein the option comprises an indication of the amount of time; and
   receiving, from the user, a response to the querying.

12. An electronic communication device comprising:
   audio input hardware configured to receive audio;
   audio output hardware configured to output audio;
   a navigation application configured to provide directions via the audio output hardware;
   an audio application configured to utilize the audio input hardware and the audio output hardware; and a processor configured to execute the navigation application and the audio application, for:
- detecting an initialization of the audio application on the electronic communication device while the navigation application is executing,
- determining that the navigation application will utilize the audio output hardware to provide the directions while the audio application is initialized,
- identifying an upcoming direction of the directions, and
- preventing the audio input hardware from receiving any audio input while the navigation application outputs the upcoming direction via the audio output hardware.

13. The electronic communication device of claim 12, wherein the processor is further configured to execute the navigation application and the audio application, for:
- identifying a warning associated with the upcoming direction, and
- preventing the navigation application from outputting the warning via the audio output hardware.

14. The electronic communication device of claim 12, wherein the processor is further configured to execute the navigation application and the audio application, for:
- detecting an incoming audio stream element associated with the initialization of the audio application,
- examining a listing of at least one rule to determine that the incoming audio stream element has a high priority, and
- providing, to a user of the electronic communication device via the audio application, an indication of the incoming audio stream element.

15. The electronic communication device of claim 12, wherein the processor is further configured to execute the navigation application and the audio application, for:
- detecting an incoming audio stream element associated with the initialization of the audio application,
- examining a listing of at least one rule to determine that the incoming audio stream element has a low priority,
- estimating an amount of time before an upcoming direction of the directions is to be audibly output via the audio output hardware, and
- managing, by the audio application, the incoming audio stream element based on the amount of time.

\* \* \* \* \*